US011323561B2

United States Patent
Prodanovic et al.

(10) Patent No.: US 11,323,561 B2
(45) Date of Patent: May 3, 2022

(54) COMMUNICATION SYSTEM FOR MITIGATING INCOMING SPOOFED CALLERS USING SOCIAL MEDIA

(71) Applicant: Mitel Networks (International) Limited, London (GB)

(72) Inventors: Radovan Prodanovic, Kanata (CA); Logendra Naidoo, Ottawa (CA)

(73) Assignee: Mitel Networks (International) Limited, London (GB)

( * ) Notice: Subject to any disclaimer, the term of this patent is extended or adjusted under 35 U.S.C. 154(b) by 48 days.

(21) Appl. No.: 17/033,582

(22) Filed: Sep. 25, 2020

(65) Prior Publication Data

US 2022/0103681 A1 Mar. 31, 2022

(51) Int. Cl.
*H04M 3/42* (2006.01)
*H04M 3/436* (2006.01)
*H04L 29/06* (2006.01)

(52) U.S. Cl.
CPC .... *H04M 3/42042* (2013.01); *H04L 63/0823* (2013.01); *H04M 3/436* (2013.01)

(58) Field of Classification Search
CPC .............. H04M 3/42042; H04M 3/436; H04L 63/0823
See application file for complete search history.

(56) References Cited

U.S. PATENT DOCUMENTS

| 9,251,193 | B2* | 2/2016 | Ariel | G06Q 10/109 |
| 2006/0015945 | A1* | 1/2006 | Fields | H04L 67/2823 726/27 |
| 2010/0057682 | A1* | 3/2010 | Ramsay, Jr. | G06Q 10/10 707/E17.014 |
| 2015/0134461 | A1* | 5/2015 | Menon | G06Q 30/0269 705/14.66 |
| 2017/0111364 | A1* | 4/2017 | Rawat | H04L 63/1433 |
| 2020/0366669 | A1* | 11/2020 | Gupta | H04L 63/107 |
| 2021/0042764 | A1* | 2/2021 | Rungta | H04L 63/083 |

* cited by examiner

*Primary Examiner* — Binh Kien Tieu (57) ABSTRACT

A communication system mitigating the risk of an incoming spoofed caller. The method involves issuing a token or a digital certificate to each network connection of a user, such as to each member of a social media platform to which the user is connected. The method includes determining a validity of the token or certificate of the network connection with a receiving party, which may be performed in response to searching and identifying the receiving party by a calling party. The method includes transmitting a message to the receiving party by the calling party in response to the validity confirmation of the token or the digital certificate. A message is transmitted that includes a calling identifier to be displayed to provide calling ID to the receiving party and a time of the intended call. The message may provide connection details, mutual connections, and historical events with the calling party.

20 Claims, 6 Drawing Sheets

COMMUNICATION SYSTEM FOR MITIGATING INCOMING SPOOFED CALLERS USING SOCIAL MEDIA

FIELD OF THE INVENTION

The present disclosure generally relates to electronic communication methods and systems including those utilizing the Internet and cloud-based solutions. More particularly, examples of the disclosure relate to electronic communication methods and systems that can mitigate incoming spoofed callers using social media to identify trusted callers.

BACKGROUND OF THE DISCLOSURE

Mobile and web applications allow users, such as operators of smartphones and other portable computing devices as well as tablets, laptop, notebook, and desktop computers, to perform a wide range of communication functions. Of course, one continuing use of smartphones and portable computing devices (together "client devices") is to participate in audio and video calls with friends, family, co-workers, and other acquaintances (e.g., people known to the call recipient (or the "called party")). While not a new problem, an ongoing and challenging issue is how to detect and block calls from unwanted callers.

In recent years, telemarketing organizations, scammers, and others spoof caller ID in an attempt to have the called party receive calls from such unwanted callers. Caller ID spoofing is the practice of causing the telephone network to indicate to the receiver of a call that the originator of the call is a station other than the true originating station. This can lead to a caller ID display on a client device such as a smartphone showing a phone number different from that of the telephone from which the call was placed. The term "spoofing" is commonly used to describe situations in which the motivation is considered malicious by the originator. One effect of the widespread availability of caller ID spoofing is that many in the public believe that you can no longer trust call ID.

Call spoofing is being used by scammers to hide their real identity and make fraudulent calls. The caller deliberately falsifies the information transmitted to the display of the receiver's device to disguise their identity. Unfortunately, this can result in an incoming call appearing to originate from a trusted contact or from a local number, and the called party may answer the call and fall into the trap of the scammers. A recent study suggests that people fell victim to call scams leading to a loss of $8.9 billion (USD) in the United States alone, with the average person reporting receipt of twenty-three spam calls per month. Call spoofing is widespread, with the number of fake calls (e.g., calls with a misrepresentation of the caller's identity) including 26.3 billion robocalls that were placed to U.S. phone numbers in 2018 and with estimates in 2019 indicating half of all cellphone calls being from spam callers.

Caller ID on smartphones and other client devices fundamentally has no authentication mechanism such that it is easily spoofed. Various solutions have been introduced to detect caller ID spoofing, but these solutions have failed to successfully address this deficiency in existing communication systems. In brief, these involve use of call filters, covert channels, and identifying the caller by tracing the calls to the corresponding SIP-ISUP interworking, using single-ended audio features to determine call provenance, calculating packet loss and noise profiles to determine source and path of the call, and digital signatures.

One exemplary approach is labeled as the STIR/SHAKEN technique. To overcome the influx of unwanted calls in the service provider's network, the industry has created two standards: (1) STIR (Secure Telephone Identity Revisited) and (2) SHAKEN (Signature-based Handling of Asserted Information using tokens). Together, these two standards create the framework to ensure every SIP-signaled call has a certificate of authenticity attached to it (e.g., a digital signature) that allows service providers to verify caller ID to mitigate unwanted robocalls and attempts to prevent bad actors from using caller ID spoofing. With STIR/SHAKEN, a service provider can try to restore their end customer's trust in the validity of caller ID.

Another approach is "iVisher," which attempts to provide real-time detection of caller ID spoofing. An iVisher system is configured for detecting a concealed incoming number (e.g., a caller ID) in SIP VoIP initiated phone calls. The iVisher system is capable of detecting a concealed caller ID without significantly impacting the overall call setup time. Another approach is provided by SecureLogix, which delivers a unified voice network security and call verification system. It protects the customer from call attacks and authenticates inbound calls through a smart and affordable auto-authentication solution that is scalable across a contact center and enterprise. An additional technique that has been implemented is called Knowledge-based Authentication or KBA. KBA requires knowledge of private information of the individual to prove that the person providing the identity information is the owner of the identity.

Others have employed "PinDrOp," which is a mechanism to assist users in determining call provenance, i.e., the source and the path taken by a call. The mechanism employs techniques to detect and measure single-ended audio features to identify all of the applied voice codecs and to calculate packet loss and noise profiles while remaining agnostic to characteristics of the speaker's voice (as this may legitimately change when interacting with a large organization). In the absence of verifiable call metadata, these features in combination with machine learning allow the mechanism to determine the traversal of a call through as many as three different providers (e.g., cellular, then VoIP, then PSTN, and all combinations and subsets thereof) with high accuracy.

Any discussion of problems provided in this section has been included in this disclosure solely for the purposes of providing a background for the present invention and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure relate to electronic communication systems, and corresponding methods performed by such systems, that can, for example, enhance the person-to-person communications including telephone communications between two (or more) callers. In brief, the communication system (and corresponding method(s) implemented by such a system) is adapted for mitigating (e.g., identifying, controlling, blocking, and the like) incoming spoofed callers through the use of social media.

Figure 1:
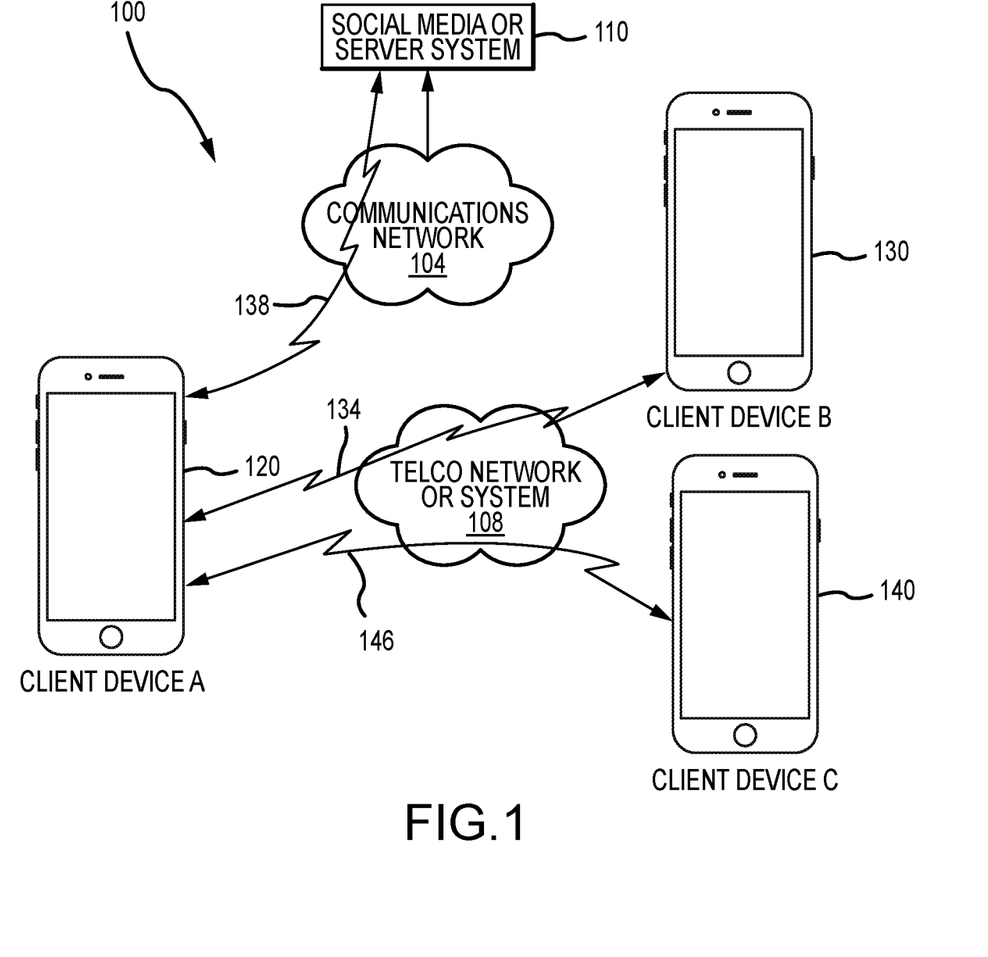
FIG. 1 illustrates an electronic, cloud-based communication system adapted to mitigate incoming spoofed callers using social media in accordance with exemplary embodiments of the disclosure.

FIG. 1 illustrates an electronic, cloud-based communication system 100 in accordance with exemplary embodiments of the disclosure that is specially adapted to mitigate spoofed callers. The system 100 is shown at a high level and includes a communications network 104 and a telco network or system 108 (note, a social media framework can also become the telecommunications framework such that the Facebook (or other social media service or platform) user is receiving a call from a fake profile, in which case the systems and methods described herein can mitigate the spoofed identity using the social media utility/application), with the network 104 being used to facilitate digital communications via the Internet or similar networks, thus providing an out-of-band signaling path relative to the telco network 108, and with network 108 being representative of a wireless (or wired) system run or operated by a telephone service provider to provide communication links between communications or client devices (e.g., cellphones, smartphones, computing devices configured for making telephone calls, and so on). The system 100 further includes a social media server or system 110 that is accessible by client devices over the communications network 104, and it may be used to facilitate use of one or more social media applications or services such as, but not limited to Facebook™, Twitter™, Instagram™, LinkedIn™, and the like as the present invention is useful with nearly any social media server 110.

The system 100 includes a first client device 120 that may be a member of the social media service provided by server/system 110 and interact with the social media sever 110. Further, the first client device 120 may use (concurrently or separately in some circumstances) the telco network 108 to communicate with second and third client devices 130 and 140. In some cases, the first client device 120 may use the system 100 (as discussed in detail below) to mitigate spoofed callers by verifying that a requested communication link or call as shown with arrow 134 from the second client device 130 is a trusted or non-spoofed caller (i.e., being used by a trusted user or operator) through interactions with the social media server 110 via network 104. In other cases, though (such as when an Internet connection is not readily available), the client device 120 will locally perform similar spoofed caller mitigation to determine whether a call or communication link 146 over the telco network 108 should be trusted and accepted or be identified as likely being from a spoofed caller and be blocked or rejected.

Devices 120, 130, and 140 can be or can include any suitable device with wired or wireless communication features that can connect to networks 104 and 108 (with three being shown for simplicity but the system 100 typically including many of such device and including additional telco networks 108 and social media servers/systems 110). For example, devices 120, 130, and 140 can include a wearable device, a tablet computer, a wired phone, a mobile phone, a personal (e.g., laptop or desktop) computer, a streaming device, such as a game console or other media streaming device, or the like.

The system 100 is configured to: (a) avoid spoof calls; and (b) provide a means of allowing blocked calls in exceptional situations that may be user defined (e.g., "Block all calls except those I know through my friends or work buddies"). The system implements a process or method that mitigates risk involved with spoofed or scam callers by leveraging the existing network of trusted contacts previously filtered through a social networking channel via the social media sever 110 (which may provide local data for use in detecting spoofed callers locally by the client device 120 such as for client device 140 requesting link/call 146).

The system 100 uses the established trust over the social media utility or service provided by the server/system 110 and then informs the called party (e.g., operator of the first client device 120 in FIG. 1) that a caller (e.g., an operator of second and third client devices 130, 140) in your social media network has or is about to call as shown by arrows 134, 146. The same trust can be extended, in some cases, to tertiary contacts. For example, C may be a friend of B, and A is a friend of B. Therefore, the system 100 may be configured such that when C calls A it knows the background of the caller (e.g., A knows something about C that may allow them to trust them enough to receive their call). In some embodiments of system 100, a token or certificate is issued (e.g., by an application on the media server 110 or an application running on client devices 120, 130, and/or 140) for every trusted contact that was added to a network for the social media utility or service provided by server/system 110.

Figure 2:
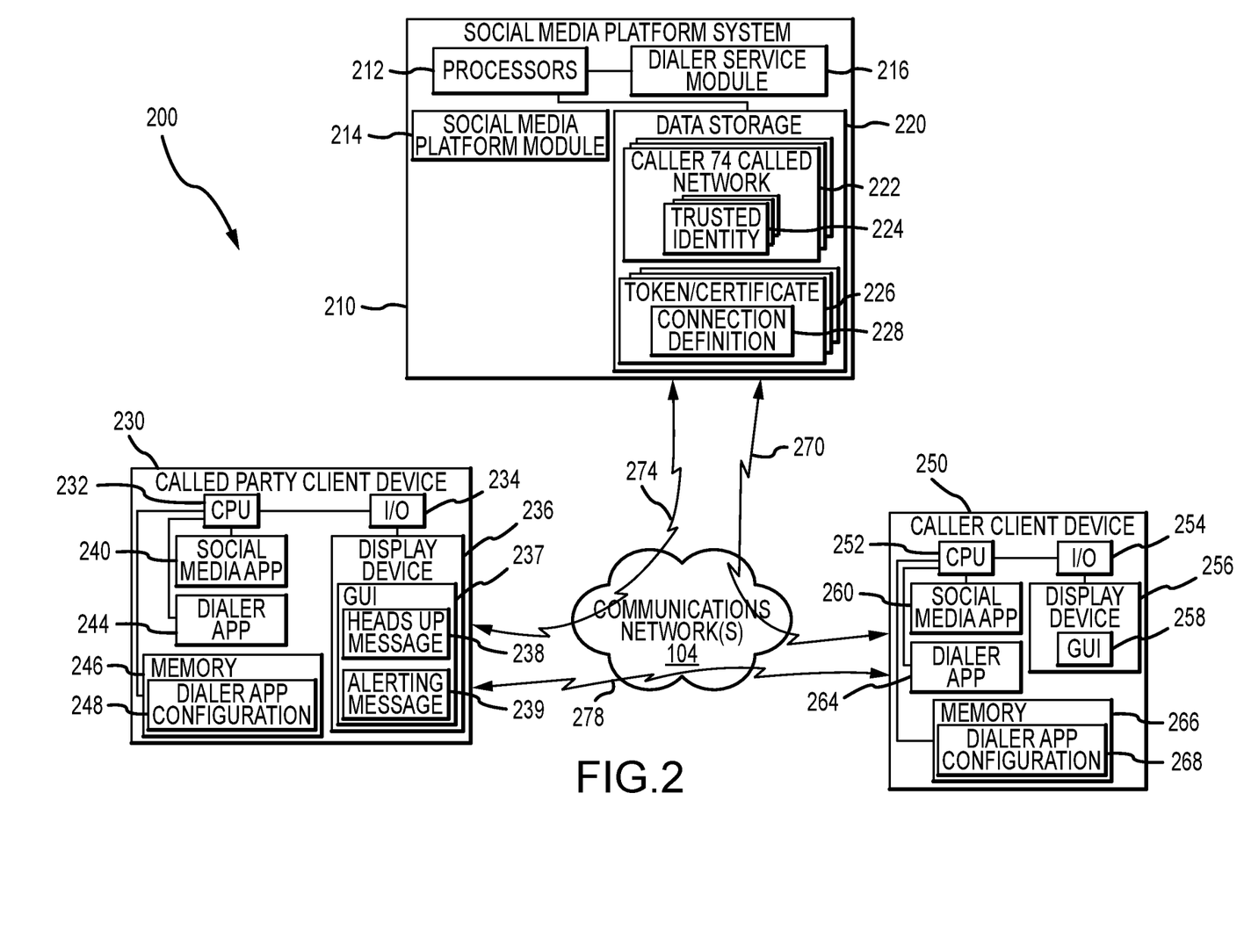
FIG. 2 illustrates a functional block diagram of a communication system (e.g., a partial implementation of the system of FIG. 1) showing more detail of embodiments of client devices and of spoofed caller mitigation components that may be provided on a social media platform or elsewhere on the cloud.

FIG. 2 illustrates a functional block diagram of a communication system 200 (e.g., a partial implementation of the system of FIG. 1) showing more detail (than in FIG. 1) of embodiments of client devices and of spoofed caller mitigation components that may be provided on a social media platform or elsewhere on the cloud. Particularly, the system 200 includes one or more communications networks 205 that communicatively link a called or receiving party's client device 230 and a caller or calling party's client device 250 and also link the devices 230 and 250 with a social media platform system or hub 210. To this end, the networks 205 may include networks used to provide the devices 230 and 250 with an Internet connection and/or with telecommunication services (such as those provided by cellular or wireless services to which the operators of the devices 230 and 250 have subscribed).

The social media platform system 210, which may be provided via one-to-many servers and data storage devices, includes a processor 212 running software or executing code/instructions to provide functions of both a social media platform module 214 (e.g., to provide social media services by interacting with social media applications on client devices) and a dialer service module 216 (e.g., to provide spoofed caller mitigation services by interacting with dialer applications on client devices). In some embodiments, the dialer service module 216 is provided on a separate server or system accessible via the network 205. The processor 212 manages access to data storage 220. The data storage 220 is used to store (e.g., in one or more databases) the social networks 222 for the caller and the called party, and this may include storing records for trusted identities 224 for each caller and called party (or user of the social media platform). Further, the data storage 220 is used to store a token or certificate 226 that includes a connection definition 228 for pairs of users of the social media platform who may be allowed to call each other over the network 205 in system 200.

The client devices 230 and 250 likely will have similar configurations with different names and features discussed with reference to FIG. 2 to assist in discussion of operations when being used/operated to receive a call (i.e., the called party client device 230) and to make a call (i.e., the caller client device 250), with it being understood that both can operate to perform either function at different operating time of the system 200. As shown, the called party client device 230 includes a processor 232 managing operations of input and output (I/O) devices 234 such as to communicate with the social media platform system 210 as shown at 274 via network 205 and to communicate with the caller client device 250 as shown at 278 via network 205. The I/O devices 234 may include a display device 236 for displaying a graphical user interface (GUI) 237, and the GUI 237 may be modified during operations of the system 200 to display a heads up message 238 or an alerting message 239 to assist in mitigating spoofed callers.

The processor 232 further operates to execute code/instructions and/or run software downloaded on the device 230 (e.g., into local memory 246) to provide the functionality of a social media app 240 and a dialer app 244. The called party client device 230 includes memory 246 that may be used to store data (at least temporarily) for display in the GUI 237 and to store a dialer app configuration 248 for use by the dialer app 244 (and/or this may be stored in the data storage 220 for use by the dialer service module 216).

Similarly, the caller client device 250 includes a processor 252 managing operations of I/O devices 254 such as to communicate with the social media platform system 210 as shown at 270 via network 205 and to communicate with the caller client device 230 as shown at 278 via network 205. The I/O devices 234 may include a display device 256 for displaying a graphical user interface (GUI) 258, and the GUI 237 may be modified during operations of the system 200 to display data related to mitigating spoofed callers. The processor 252 executes code/instructions or runs software to provide the functionality of a social media app 260 (typically the same one as app 240 on called party client device 230) and a dialer app 264. The caller client device 250 includes memory 266 that may be used to store data (at least temporarily) for display in the GUI 258 and to store a dialer app configuration 268 for use by the dialer app 264 (and/or this may be stored in the data storage 220 for use by the dialer service module 216).

With the general components of the system 200 understood, it may be useful to discuss the system's operations to achieve mitigation of spoofed callers and to highlight features that make the system 200 different from prior solutions. The system 200 leverages trusted communications based on an existing social media network 222 where trust may be publicly acknowledged. For example, a user of the social media platform system 210 may have defined a network 222 with a plurality of people they interact with or "trust" (e.g., in Facebook, the trusted identity 224 may be a friend in their network 222), but, prior to the system 200, the network 222 only was used to identify relationships and not for used in receiving calls from those in their network 222.

The system 200 utilizes a trusted network/relationship (as defined in social media platform network 222) over a social media platform (provided by system 210 and apps 240, 260 on client devices 230, 250) between the caller (or operator of caller client device 250) and the receiving or called party (or operator of called party client device 230) for verification purposes. Such verification may include prior "intimation" (such as "friending" when the platform 210 provides the Facebook service) of the intended call by the caller party to the receiving or called party. In some cases, a social media voice endpoint, such as Facebook Messenger Audio, may be used to make a call through the social media framework to the client device connected to the network (e.g., see U.S. Pat. No. 10,616,419, which is incorporated herein by reference). In such a situation, the social media user may be fake and the proposed system 200 can be used to distinguish a real account from a fake one.

In some cases, the system 200 will operate to generate and deliver to the called party a heads up message, which may be displayed on their client device 230 as is shown at 238 in FIG. 2. This may be achieved by the caller's dialer app 264, before the caller places a call 278, sending a heads up message 238 with a timestamp to the called party (or their client device 230) through the social media app 260 and platform system 210 in which the calling and the called parties already have a pre-established trusted relationship (as defined by the caller/called network 222 and a token or certificate 226 with a connection definition 228 (two caller/called identifiers, for example). The message 238 may take the form of an alert, an icon, and/or a message allowing the operator of the client device 230 to allow or prevent/block the requested call from caller client device 250.

In other cases, the system 200 may generate an alerting message that is transmitted to and displayed as shown at 239 in the GUI 237 of the called party client device 230. In these operational cases, the called party dialer app 244 receives a call 278 over network 205 and observes or determines a caller ID as a known caller ID (such as via its social media network 222 and the trusted identities 224), but the dialer app 244 recognizes that a heads up message 238 was not received from any social media app 240 and module 214 to which it is registered. In response, the called party dialer app 244 sends an injury or inquiry message, through the social media app 240, 214, and 260 (the social media service associated with this contact making identified in the caller ID) as shown with arrows 274 and 270. The injury or inquiry message is sent to the caller client device 250 for display in the GUI 258 (as shown at 239 when the device 230 may operate as a caller device), and the message is configured to request the operator of the caller client device 250 to confirm that the call 278 is genuine (originating from the device 250 and the trusted operator). If positive confirmation is received (such as via a return message 270, 274 via the social media apps 260, 214, 240), the called party's dialer app 244 accepts the call 278. If negative or no confirmation is received (such as within a preset time period), the called party's dialer app 244 rejects the call 278 as likely being a spoofed caller.

During operation of system 200, the called party social media app 240 passes the notification (e.g., confirmation that the call should be accepted or blocked) to the called party dialer app 244, and the dialer app 244 may subscribe to the social media app 240 for such notifications. The called party dialer app 244 may, in some embodiments, be configurable, with the configuration (default or set by an operator of the device 230) 248 stored in memory 246. For example, the dialer app 244 may be configurable to accept calls from the trusted parties defined for their network 222 (as shown at 244 in FIG. 2). The "trusted parties" or identities may be expanded in some cases to include those parties or possible callers that are connected through social media-verified ones, e.g., trusted if a friend of a friend in the network 222 or a member of a network belonging to one of the trusted identities or "friends" 224 of the called party's social media network 222.

Once the call 278 gets placed and called party's dialer app 244 receives the call 278, the called party's dialer app 244 verifies the call 278 is expected with the presented caller ID and allows the call 278 to proceed. The dialer app 244 also obtains the calling party's identity (as may be defined in trusted identity 224 and/or in the connection definition 228 in the token or certificate 226), and the identity may be how the caller is identified in a mutual friend list, in followers of the called party, a mobile identification number, a phone number, a connection, or other suitable identification. This identity or "number" is then displayed (e.g., in the GUI 237 or otherwise in the display 236)) by the dialer app 244 on the called party client device 230 as the calling party number or identifier. It should be remembered, though, that a token/certificate would be used to verify this number/caller as a trusted party. For example, a "friend" could include an established business such as a bank. Businesses that are trusted in your social media network would not just have a phone number that is recorded in the social media profile but would also be assigned a token/certificate (which is important since phishing and other spoofing may involve calling from a number associated with a business and recognized by a dialer app as such).

Figure 3:
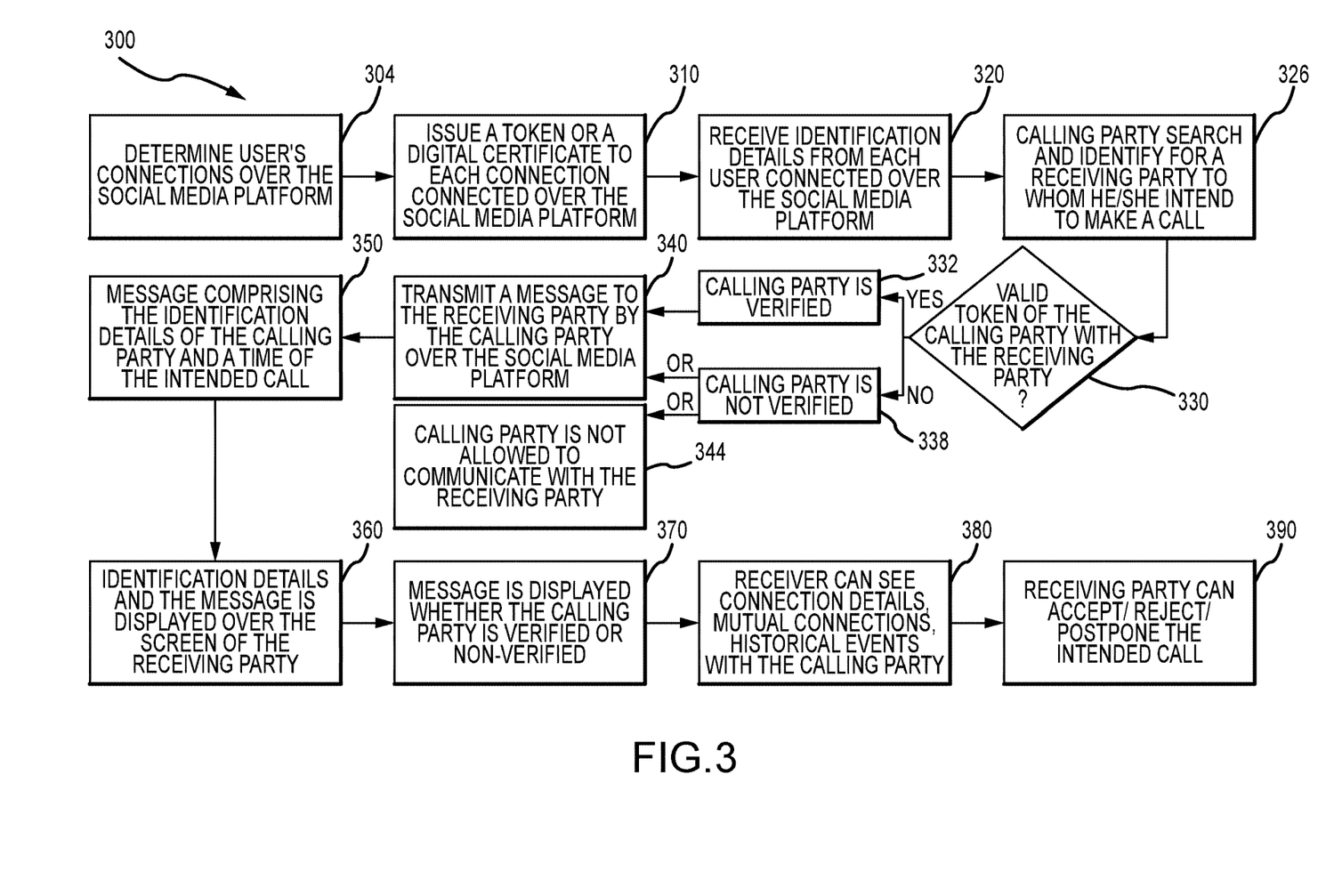
FIG. 3 illustrates a method of mitigating spoofed callers with functional blocks that may be performed using a communication system (e.g., the systems of FIGS. 1 and 2).

With the system 200 understood, it may now be useful to describe its operations to perform a method of mitigating spoofed callers 300, as shown in FIG. 3 providing functional blocks or method steps that may be performed using the communication system 200 (and/or the system 100 of FIG. 1). As discussed with reference to FIG. 2, the system 200 may be configured to issue a token or digital certificate 226 to the users connected over one, two, or more social media platforms (such as the one provided by system 210 and local social media apps 240, 260 on client devices 230, 250).

In this regard, the method 300 may begin at 304 with determining each user's connections over the social media platform. This step 304 may include each social media user (e.g., operators of called party and caller client devices 230, 250) subscribing to the dialer service 216, which may result in loading of dialer apps 244 and 264 upon the client devices 230, 250. In some cases, the social media user registers with dialer apps through its API and subscribes for notifications (both receive and transmit directions). The dialer apps 244, 264 registers with the corresponding or local social media apps 240, 260 such through its API (e.g., Facebook Developer's Kit or the like) and subscribes for notification (again both receive and transmit directions).

The social media user may submit their caller ID, name, or other identifiable factor, and, in step 304, the system (e.g., the dialer service module 216) acts to store these identifiers or factors in the records 224 for each trusted identity in each caller/called party's network or connections definition 222 in data storage 220 (e.g., within a database defining each user's connections that are allowed or trusted to receive calls from during operation of the system 200). For example, a social media user may have a handle within the social media platform but have a different name or identifier for other uses such as for work that they can provide for use in identifying them as a caller in the system 200 (e.g., ID of calling party in heads up and alerting messages 238, 239). With this information, the method 300 continues at 310 with the dialer service module 216 issuing a token or digital certificate 226 to each connection (pair of social media users as defined in a connection definition 228) connected over the social media platform provided by module 214 and system 210. Step 320 may involve the connected users providing their identification details for use in the token 226 as part of this connection definition 228 or this data may be collected in step 304 (as discussed above).

With these initial or background functions completed (and, note, these may be updated in response to changes in a user's network 222 including the issuing of a token 226 to a newly added connection/trusted identity 224), the method 300 continues at 326 with the initiation of a new call. In step 326, the calling party (such as with their dialer app 264) searches for and identifies a receiving or called party (operator of device 230) to whom he/she intends to make a call. The dialer app 264 communicates with the dialer service module 216 to determine at 330 whether a valid token 226 exists. In some embodiments, the system 200 determines the validity of the token or the digital certificate 226 associated with the receiving or called party such as by searching through the social media platform (e.g., are the calling party and receiving party Facebook friends, LinkedIn contacts, Twitter followers, WhatsApp contacts, or the like) or step 330 may simply involve determining whether the token/certificate 226 exists defining the connection definition 228 (e.g., indicating that the calling party is allowed to call the receiving party).

If a valid token exists or the connection is otherwise verified, the method 300 continues at 332 with the dialer app 264 verifying that the calling party is not a spoofed caller, and the method 300 continues at 340 with transmitting a message to the receiving party over the social media platform. As indicated at 350, the message (e.g., a heads up message 238) may be composed on the caller client device to include a time of the intended call as well as to include the identifier or identification details for the calling party (previously provided as discussed above). Hence, in operations of the system 200, after confirmation of caller validity, the calling party is allowed to transmit a message to the receiving party over the social media platform (e.g., via Facebook Messenger or the like), through which they are connected, notifying them of the upcoming call including details such as name, calling number, caller ID, and/or the like.

In some cases, though, the system 200 will be unable to verify (in steps 330 and 338) the calling party (e.g., there is no social media connection in network 222 or there is no token or digital certificate 226 defining a connection 228 between the calling party and the receiving party). In such cases, the system 200 may operate to block the calling party from communicating with the receiving party (e.g., block the transmittal of a heads up message 238) or, alternatively, the system 200 may allow at 340 the calling party to send a heads up message 238 to allow them to choose whether or not to accept a call from the calling party (see block/step 390 in FIG. 3). For example, if no token or digital certificate 226 is discovered between the calling party and the receiving party, the system 200 will either not allow the calling party to send a message (or, in some cases, call) the receiving party or intimate the receiving party with a message indicating that an upcoming call may soon be received from a calling party that is not verified (at which point the called party can make an informed decision to answer or ignore the call 278). Specifically, a receiving party may receive a denied call message over the social media platform or via the alerts on the dialer app 244 (e.g., "Your Identity May Have Been Breached on Social Media Platform N").

As indicated in box/step 360, the called party client device 230 is operated to provide identification details for the calling party, with the heads up (or other) message 238 being displayed over the screen 236 of the receiving party's device 230. As indicated in box/step 370, the message 238 may provide an indication of whether or not the calling party has been verified as being a trusted caller via their social media networks. Then at step 380, it is noted that the message 238 may include information such as connection details (e.g., identifier for the calling party), mutual connections (e.g., the calling party is a friend of a friend in the social media platform), historical events involving the calling party over the social media platform. The method 300 continues at step 390 with the receiving party being able to take action in some embodiments via the dialer app 244 such as to accept or reject the call or to postpone the call to a later time. This information may be transmitted back to the calling party, e.g., via a social media message or an alert/notification from their dialer app 264, or the dialer app 244 of the receiving party device 230 may simply act on this user selection, e.g., by allowing the call to be received, by blocking the call 278, and so on.

To summarize, the systems 100 and 200 may be operated to perform a method of mitigating the risk of an incoming spoofed caller. The method includes the following steps or stages: (a) issuing a token or a digital certificate to each network connection of a user (e.g., to each member of a social media platform to which the user is connected (with connection or "trust" being defined within the social media platform)); (b) receiving at least one identification detail of each user connected over the social media platform (e.g., a calling name, a calling number, a calling ID, or the like); (c) determining a validity of the token or the digital certificate of the network connection with a receiving party (which may be performed in response to searching and identifying the receiving party by a calling party); (d) transmitting a message to the receiving party by the calling party in response to the validity confirmation of the token or the digital certificate of the network connection of the calling party with the receiving party over the social media platform (e.g., a message may be generated and transmitted that includes at least one of a calling number and/or name to be displayed to provide calling ID to the receiving party and a time of the intended call); (e) viewing the connection details, mutual connections, and/or historical events with the calling party in response to receiving the message from the calling party over the social media platform; and (f) triggering an action based on the received message such as an accept, a reject, or a postpone action for the requested/intended call.

As will be appreciated from the above discussion, the new system offers protection from unsolicited callers or spammers by ensuring that only verified callers (e.g., an operator of a client device in FIGS. 1-3) are able to contact someone using the system and unverified callers will be flagged as coming from an untrusted source (but, note that in some implementations the callee/receiving party may decide to accept either or neither call from a caller/calling party). The proposed method implemented by the system may involve a social media server (e.g., Facebook), a caller app, and a cloud PBX (for TDM calls). Whenever an incoming call is received, the caller app verifies that the user of the calling client device is trusted by reviewing the social profile associated with the caller. Whenever a user creates their social media profile, the call recipient depends on the meshing of those so called "contacts" or "friends" that establishes a network of familiarization.

The caller app originally may create a digital token for every social media contact that the recipient has in their personal network. The trusted network can be configured to include primary contacts (e.g., first order connections), secondary contacts (second order connections), and even tertiary contacts who are third in order or level within the social media framework, e.g., LinkedIn, Liker.com, Facebook, Twitter, or the like. Multiple social media footprints can be used to build up the trusted contact list, which may be stored by the caller app (locally on a client device or on a network-available server). In some implementations, it may be preferred that the allowed contacts may be created either on the basis of a cross-referenced identity (e.g., "I know this person from my Facebook network, and I am manually adding their number to the this profile . . . ") or learned from an existing profile that already includes their various respective phone numbers. Variations may include voice capabilities that are built into social media utilities such as Facebook Voice and Video Calling.

In either case, once the system extracts a new profile, the system may store the new profile as an alias in the caller app (or in a way accessible by the app). As mentioned, for each alias, a digital token is created and then stored by the caller app as well. The alias can also function as a prerequisite in calling that person within the caller app. The digital token is used by the caller app to determine when to allow an incoming caller to be labelled as someone the recipient can trust. In some cases, the trusted incoming caller is also indicated within the caller app graphical interface such as by using a notification (e.g., <Incoming_Caller_Name> is a "

Trusted Contact" (with the circle being shown green or otherwise indicating the call is a "Go" or can be accepted) or the like).

It may be useful at this point to describe one useful (but non-limiting) general use-case. In this exemplary use case, a call comes in from the PBX (or social media apparatus) and the header information (CID) is verified by the caller app. The incoming identity is checked against the metadata represented in the alias, which leads the caller app to verify that this is either a new caller or an existing contact. The system can then check if a digital token is present. The presence of a token is what determines if a call is allowed and not the sole presence of an alias. Sometimes, a known contact may not be someone the user associated with a caller app wants to accept calls from, such as an annoying friend/network connection, a local business you connected to on Facebook ("Liked"), and so on. For these connections with an alias assigned, a digital token can be rescinded (or never issued), but they remain a known connection (or "friend") in the social media network. The presence of a digital token determines if the call should be allowed, in which case the PBX connects the parties. The caller app, in some implementations, can issue a hard block of the call or simply advise the user of a client device that the incoming caller is trusted or not be trusted (so that the user can choose to accept it or not).

Figure 4:
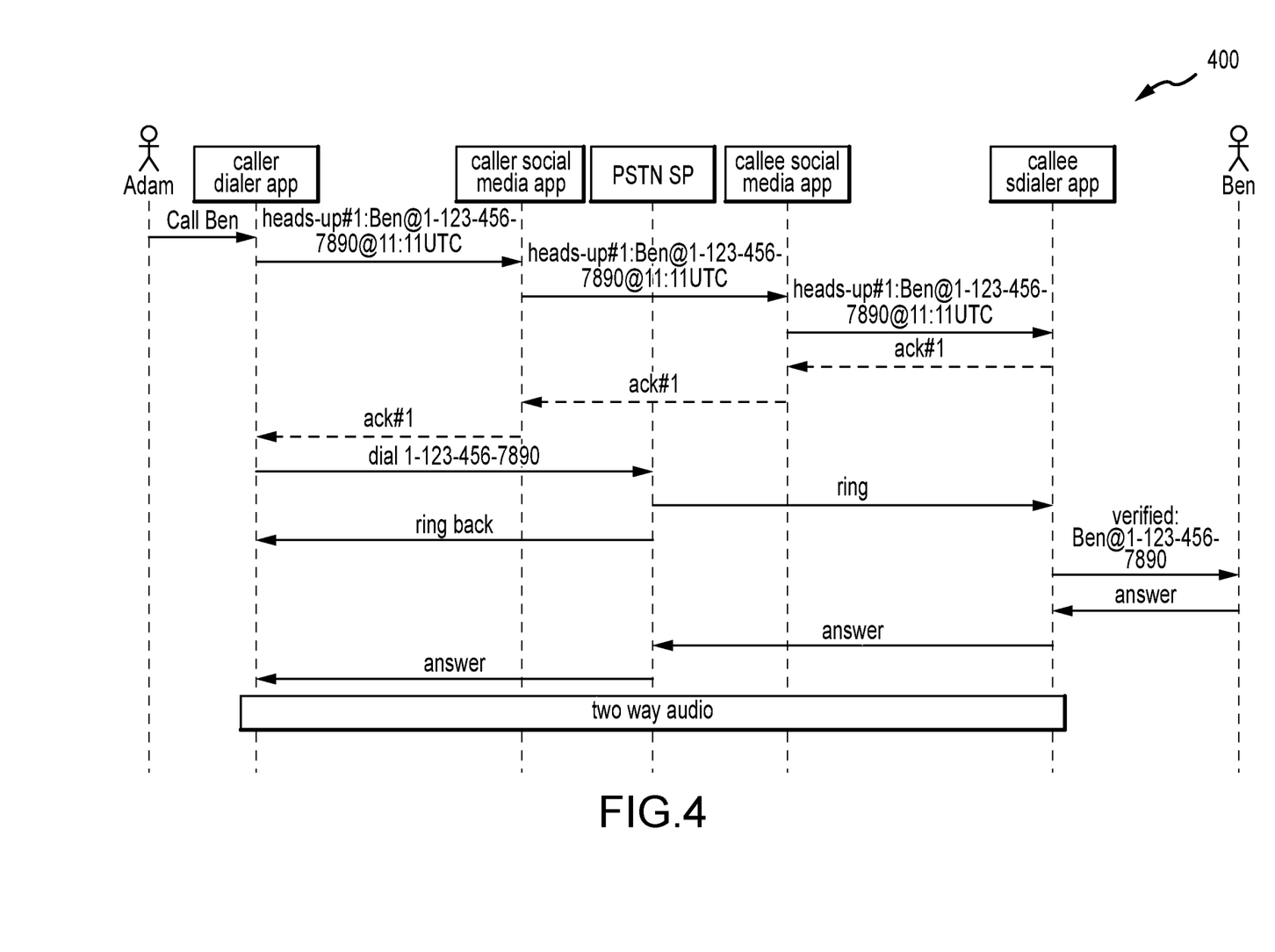
FIG. 4 illustrates a call sequence or use case scenario as may be provided during operations of the systems of FIG. 1 and/or FIG. 2.
Figure 5:
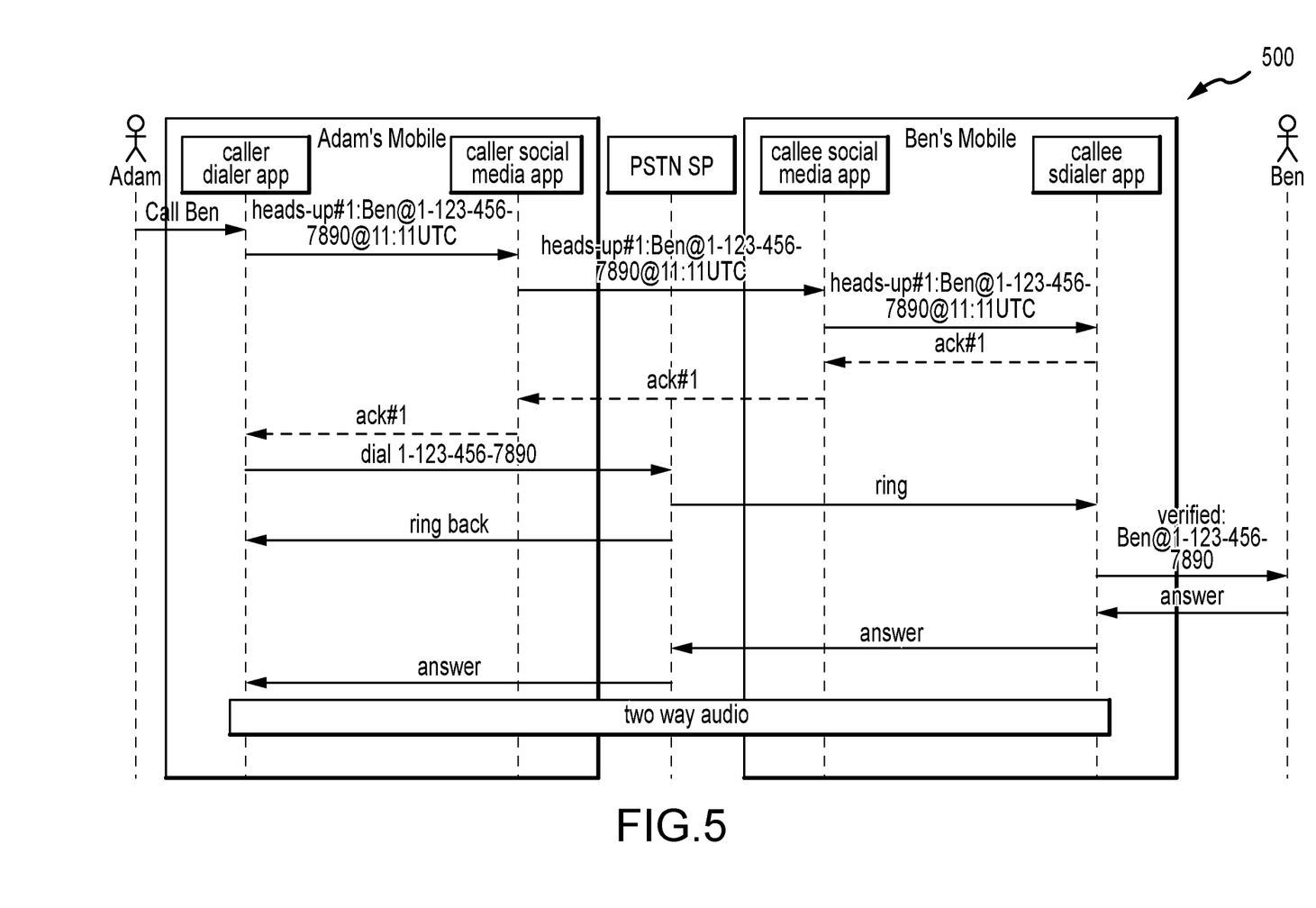
FIG. 5 illustrates a variant of the scenario of FIG. 4 that encapsulates relevant apps under each participant's mobile or client device.
Figure 6:
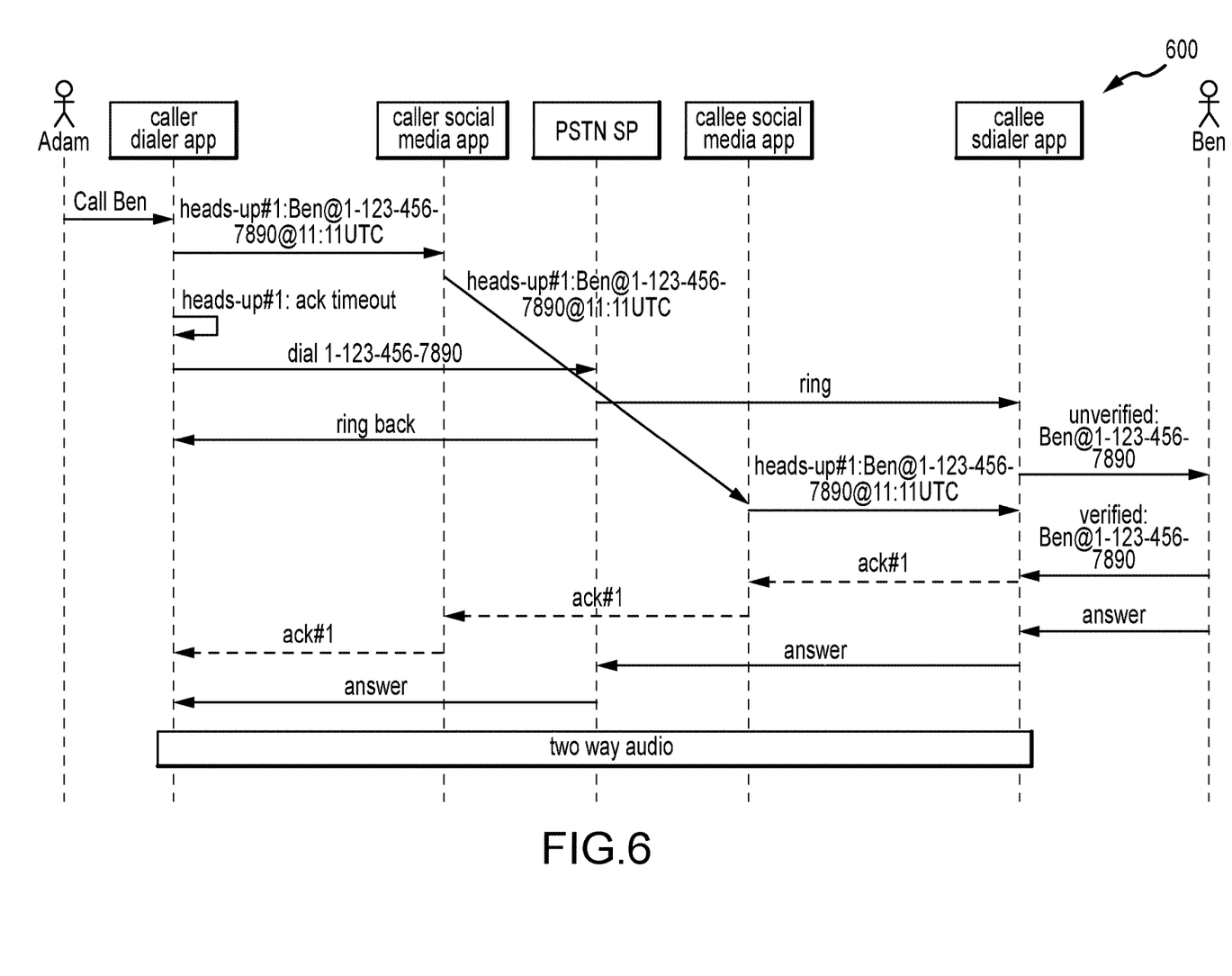
FIG. 6 illustrates a call sequence or use case scenario in which the heads-up message gets delayed.

To further clarify the operations of system (such as system 100 or system 200 of FIGS. 1 and 2), it may be useful to presented call or data flow sequences for additional use cases. FIG. 4 illustrates a call sequence or use case scenario, with diagram 400, as may be provided during operations of the systems of FIG. 1 and/or FIG. 2. FIG. 5 illustrates a variant of the scenario of FIG. 4, with diagram 500, that encapsulates relevant apps under each participant's mobile or client device. FIG. 6 illustrates a call sequence or use case scenario, with diagram 600, in which the heads-up message gets delayed.

Scenario diagram 400 of FIG. 4 shows the case where a heads-up message makes it quickly through the network and alerts the callee prior to the PSTN network (or other communication network used for calling) signaling. Scenario diagram 500 of FIG. 5 is a variant of the use case or scenario of FIG. 4 in which the relevant applications are encapsulated or shown under each participant's mobile or client device (in this example, the caller is Adam using his mobile device (e.g., a smartphone or the like) and the callee or receiving part is Ben using his mobile device). In FIG. 6, the use case 600 shows the case in which the heads-up message is delayed from reaching the callee (such as "Ben" in the FIG. 5 example), but it still arrives in a timely enough manner to allow the callee to use it make a decision as to whether or not to answer a received call on their mobile or client device.

In the two examples shown by diagrams 400, 500, and 600, spoofing is controlled or mitigated using the existence of messaging applications associated with one (or more) social media applications (such as Facebook Messenger, LinkedIn Messaging, and the like) and the end-to-end encryption provided by such messaging applications. These two features of social media applications mean that both the trusted relationships and secure communication channels have already been established and can be used to provide enhanced mitigation of spoofed callers.

As a result, the heads-up messages would ride on the pre-established communication channels without the need for a dialer service module 216, in some preferred cases or implementations of system 200. Instead, the social media application 240,260 on mobile or client devices 230, 250 in the system 200 of FIG. 2 provide API for the dialer apps 244, 264 to: (i) register, and (ii) send messages it (e.g., Adam, in the example of FIG. 5, is calling Ben with this number at this time). The social media app, with its messaging component, would form a message for the peer's social media app on the callee's side. Once received, the callee's social media app would interpret this message and instead of posting it to the social media app GUI, it would instead be adapted to alert the callee's dialer app (that previously had registered with it for such a service).

The message sequence charts 400, 500, and 600 show an approach to spoofed caller mitigation that uses the pre-established trusted relationship and also the way to communicate privately though a secure communication channel that was also pre-established as part of the social media-associated messaging app. To achieve an end-to-end encryption (so that only Adam and Ben can read the content of messages they exchange and anybody else who might be either snooping or just serve as a transport medium or service see it as gibberish), the system is configured such that only the device users (e.g., first and second users labeled Adam and Ben above) have full control of their private keys, but typically not the social media servers or service providers. Posting on a social media platform (such as Twitter or Facebook) is public in nature, but exchanging messages with members of that social network should not be via the messaging services or applications provided by the social media applications associated with such platforms. Stated differently, the system 200 may utilize dialer apps 244, 264 that are enhanced or modified (not just a dialer app that most mobile or client devices have already installed and use to make mobile/PSTN calls) to be able to interface with messaging apps associated with social media via an enhanced API that the messaging app would provide and send heads-up messages as out of band (with respect to the mobile/PSTN network) signaling messages.

The operations of the system (such as system 200 of FIG. 2) shown in use case/scenario 400, 500 is one way the social media designation for a known contact can be used to verify an out of band call (i.e., PSTN). In some cases, the social media platform might have an open architecture allowing the phone/client device dialer app to directly connect with the social media server to verify that the dialer app's request to verify a user is received. The social media server could then issue a thumbs up or acknowledgement, which can be remembered using a digital token or the like for future calls. The allowed call will proceed provided the digital token remains valid. As discussed above, the first time the unknown caller calls will result in an initial checking of the social media profile that leads to the digital token and associated steps. Then, subsequent calls from the person/same caller will result in steps to verify that the token is still a valid one. If not such as when the caller ends up being unfriended, the dialer app may alert the recipient that this person cannot be trusted.

Another option is that the dialer app is used to interface with the installed social media client app as a means to verify the contact through the social media server. So instead of a caller manually sending a message via a social media messaging service (e.g., "I am about to call you from this number"), the messaging is automated by the systems described herein. This approach does not make social media platform-based call, but it, instead, uses the messaging service of the social media platform as an out of band signaling path for heads-up messages. The call still goes through the mobile/PSTN network.

In FIG. 1, network 104 can include or be, for example, an internet protocol (IP) network. Exemplary types of networks suitable for communication with network 104 can be or include a local area network, a wide-area network, a metropolitan area network, wireless networks, a private branch exchange (PBX), or a portion of the Internet. Various components of network 104 can be coupled to one or more other components using an Ethernet connection, other wired connections, and/or wireless interfaces. Network 104 can be coupled to other networks and/or to other devices typically coupled to networks. By way of particular example, network 104 includes a communication network, and network 104 can be coupled to additional networks that can be coupled to one or more devices, such as devices 120, 130, and 140, which may communicate via spoofed caller mitigation provided during operations of the system 100.

It will be appreciated from the above description that the communication systems taught herein may be used to provide auto-verification of callers in real time using cost effective and pre-established network connections over social media platforms. Social groups other than friends or official contacts of social media platforms may also be utilized to mitigate spoofed callers such as special interest or other defined groups such as "Tuesday Tech at the Pub" and the like that may be groups identified by a social media platform without necessarily being friend as these connections defined by the platforms may be trusted by some users of the system. Such levels of "trust" can be configured or defined as shown at 248 for each user's dialer app 244 so that a user can dial up or down the list of those trusted and allowed to place calls to their client devices. Note, the "trust" may be applied on a person-by-person level and/or may be applied to groups of possible callers including businesses or organizations (e.g., the connection may be with such a group and result in the dialer app allowing calls from anyone linked to that group (e.g., accept calls from employees of Hospital D, Bank J, and so on, from members of My Craft Club, and the like). The scope of the mitigation performed by communications systems of the present description are not limited to providing automated security protection from unsavory call centers and voice networks but can also provide defense against one or more of the following: TDoS attacks; call pumping, robocalls; account takeover attacks; and other threats. Typically, the system is configured to validate an incoming call using the social media-based information (including trusted connections) without the need to go through a telephone company (including wireless providers).

Further, with regard to social media users receiving voice calls from imposters, the systems described herein may be configured such that the fake accounts that could be created could be declined on the basis of a token not being present. So, as with regular phone devices, received calls from devices using social media platforms/service can be verified using social media.

As used herein, the terms application, module, analyzer, engine, and the like can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices).

The present invention has been described above with reference to a number of exemplary embodiments and examples. It should be appreciated that the particular embodiments shown and described herein are illustrative of the invention and its best mode and are not intended to limit in anyway the scope of the invention as set forth in the claims. The features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

We claim:

1. An electronic communication system adapted to mitigate spoofed callers comprising:
a first client device communicatively linked to a communications network;
a social media application interacting via the communications network with a social media platform to generate a connection network defining a set of trusted members for an operator of the first client device; and
on the first client device, a dialer application validating an operator of a second client device as a trusted caller of the operator of the first client device by determining whether the operator of the second client device belongs to the set of trusted members.

2. The electronic communication system of claim 1, further comprising data storage accessible via the communications network storing a token or digital certificate for each member in the set of trusted members and wherein the validating, performed by the dialer application or another validity verification module, comprises accessing the data storage to verify the operator of the second client device is associated with one of the tokens or digital certificates.

3. The electronic communication system of claim 2, wherein each of the tokens or digital certificates includes an identifier for a particular one of the set of trusted members and wherein the dialer application displays the identifier associated with the operator of the second client device after completing the validating.

4. The electronic communication system of claim 1, wherein, after the validating, the dialer application operates to receive and display at the first client device a heads up message including at least one of a proposed time for a call from the trusted caller, an identifier for the operator of the second client device, details regarding a connection between the operators of the first and second client devices, mutual connections of the operators of the first and second client devices, and historical events associated with prior communications between the operators of the first and second client devices.

5. The electronic communication system of claim 1, wherein, after the validating, the dialer application requests input, via operations of the first client device, from the operator of the first client device to accept, reject, or reschedule a time for a call proposed by the trusted caller via the social media platform and wherein, in response, the dialer application accepts, rejects, or reschedules the call.

6. The electronic communication system of claim 1, wherein the trusted members include an organization or group or include a participant of the social media platform having a connection to one of the trusted members.

7. The electronic communication system of claim 1, wherein the operator of the second client device communicates with the social media platform to identify the operator of the first client device and generates a heads up message related to a proposed call between the operators of the first and second client devices for transmittal to the first client device via the social media platform.

8. The electronic communication system of claim 1, wherein the validating by the dialer application comprises determining that a call has been received at the first client device from the second client device prior to receipt of a heads up message and, in response, transmitting an inquiry message via the social media platform to the second client device requesting confirmation the operator of the second client device placed the call.

9. The electronic communication system of claim 1, wherein the social media application supports a voice call and the validating by the dialer application includes determining whether the operator of the second client device belongs to the set of trusted members by verifying the operator is associated with a social media identity that is trusted.

10. A method of mitigating spoofed callers comprising:
identifying a plurality of connections of a user of a social media platform provided over a digital communications network;
with a dialer service module coupled to the digital communications network, issuing a token or digital certificate to each of the connections of the user of the social media platform;
with a calling party client device, searching using the social media platform to identify the user of the social media platform;
with the calling party client device, requesting a call with the user of the social media platform;
with the dialer service module, validating whether the requested call is from a trusted identity by verifying one of the tokens or digital certificates is associated with the calling party client device or with an operator of the calling party client device; and
in response to the validating, transmitting a message via the social media platform to the user for display on a receiving party client device linked to the digital communications network.

11. The method of claim 10, wherein the message comprises at least one of a calling number, an identifier of the operator of the calling party client device, and a proposed time for the requested call.

12. The method of claim 10, wherein the message includes a user-selectable action including at least one of accept, reject, and postpone and wherein, in response to a user selection, a dialer application on the receiving party client device performs the user selectable action for the call.

13. The method of claim 10, wherein the message comprises details regarding a connection between the operator of the calling party client device and the user, mutual connections of the operator of the calling party client device and the user, and historical events associated with prior communications between the operator of the calling party client device and the user.

14. The method of claim 10, further comprising the user subscribing to the dialer service module and wherein the dialer service module is associated with the social media platform.

15. The method of claim 10, further comprising, with a dialer application on the receiving party client device, receiving input from the user to configure the dialer application to allow calls to be received from only a subset of the connections from which calls may be received or from users of the social media platform that have connections to the connections of the user of the social media platform.

16. A method of mitigating spoofed callers comprising:
establishing a secure communication channel between a first user and second user via social media applications running on first and second client devices operated by the first and second users;
with a dialer application on the first client device, sending a call initiation message to the social media application running on the first client device;
in response to the sending of the call initiation message, the social media application transmits a heads-up message over the secure communication channel to the social media application running on the second client device;
with the social media application running on the second client device, alerting a dialer application on the second client device of a call from the first user via the first client device; and
with the dialer application on the second client device, receiving the call over a telephone network.

17. The method of claim 16, wherein the sending of the call initiation message is performed automatically by the dialer application on the first client device in response to the first user initiating the call over the telephone network.

18. The method of claim 16, wherein the secure communication channel provides end-to-end encryption, wherein the secure communication channel is created between messaging applications associated with the social media applications on the first and second client devices, and wherein the messaging application on the first client device generates and transmits the heads-up message.

19. The method of claim 16, further comprising determining whether the first user has been assigned a token indicative of being a trusted caller of the second user and providing a result of the determining step in the alerting step.

20. The method of claim 16, wherein the alerting step is completed prior to the receiving step.

* * * * *